Figure 1:
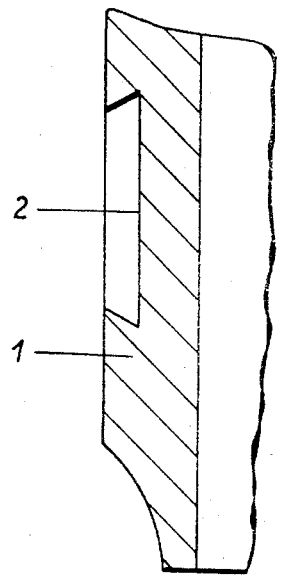

Sept. 20, 1966 F. G. KOLLMANN ETAL 3,273,419
BALANCING WEIGHT CONSTRUCTION
Filed Nov. 12, 1964 2 Sheets-Sheet 1

INVENTORS
Franz Kollmann
Friedrich Laussermair
By Dickey & Craig
ATTORNEYS

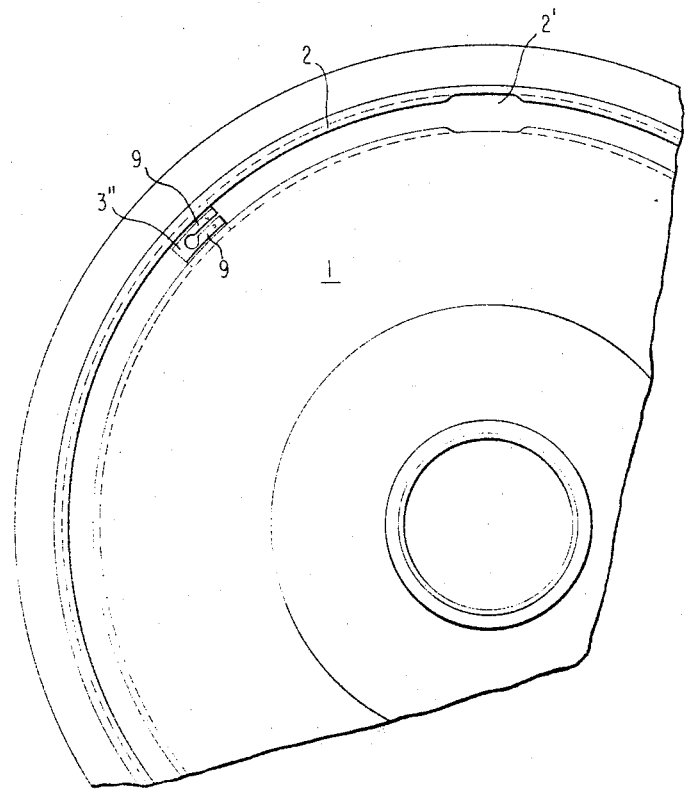

United States Patent Office 3,273,419
Patented Sept. 20, 1966

1

3,273,419
BALANCING WEIGHT CONSTRUCTION
Franz G. Kollmann and Friedrich Laussermair, Munich, Germany, assignors to BMW Triebwerkbau G.m.b.H., Munich-Allach, Germany
Filed Nov. 12, 1964, Ser. No. 410,472
Claims priority, application Germany, Nov. 13, 1963, B 74,240
6 Claims. (Cl. 74—573)

The present invention relates to fastening of balancing weights installed on rotating bodies, especially at rotors of flown machines with high rotational speeds, within annularly shaped apertures arranged at the end faces of the rotating bodies.

It is known to provide rapidly rotating rotors and the like, of which the highest demands are made as regards the balanced condition thereof, with an annular groove, for example, of dovetail-like shape, arranged at the end face thereof for the accommodation of balancing weights. The balancing weights formed corresponding to the cross section of the dovetailed groove are thereby inserted into the annular groove by way of an insert opening and can then be brought within the annular groove to the required place of the rotating body for balancing the unbalance thereof. For securing the balancing weights against tangential displacement, the balancing weights are normally wedge over or peened over against the rotating body.

This manner of fastening and securing of the balancing weights, however, entails various shortcomings as regards displacement of the weights. Thus, on the one hand, the balancing weights have to fit accurately in the annular groove in order to deform as little as possible the rotating body or the outer part of the annular groove during wedging or peened over, which in turn, requires a construction such that the displacement of the weights themselves is rendered very difficult. Additionally, already wedged or peened over balancing weights can be removed or displaced only by the destruction of the wedge or the peened over connection and therewith only by damaging the rotating body as well as the balancing weight so that an eventual re-balancing without remachining or refinishing of the circular groove and of the balancing weights and/or without use of new balancing weights is practically impossible in the prior art.

A further disadvantage of the known securing means of the prior art resides in the fact that during the wedging or peened over operation, notch stresses are produced by the plastic deformation of the rotating body which lead to an additional, extremely disadvantageous loading and stressing of the rotating body operating at high rotation speeds.

The present invention aims at eliminating these disadvantages and proposes for that purpose to provide mutually cooperating means in said weight and said groove by constructing the balancing weights as inherently elastic or springy bodies comprising elastic structural portions having thereon abutment surfaces spaced from each other for a distance corresponding approximately to the cross section or width of the respective recess or groove whereby the balancing weights, by reason of the inherent elasticity thereof, spread against the sidewalls of the recess or groove and are tangentially non-displaceably secured therein by the frictional engagement.

Accordingly, it is an object of the present invention to provide a balancing weight which is so constructed as to eliminate the aforementioned shortcomings of the prior art, particularly as regards the problems arising with fastening and subsequent readjustment thereof.

Another object of the present invention resides in the provision of balancing weights of such construction as to obviate the need for an accurate fit between the balancing weights and the annular groove of the rotating body receiving the same.

A further object of the present invention resides in the provision of a balancing weight construction which is not only simple and inexpensive to manufacture and easy to install but which also greatly facilitates the adjustment and displacement of the weights.

A still further object of the present invention resides in the provision of balancing weights of such construction as to permit subsequent readjustment and relocation of the balancing weights within the rotating body without necessitating damage to and/or destruction of the rotating bodies and/or balancing weights.

Another object of the present invention resides in the provision of balancing weights minimizing the danger of notch-stresses within the rotating bodies and substantially eliminating the limitations existing heretofore as regards the choice of material for the balancing weights.

Figure 2:
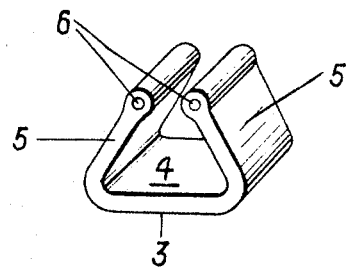
Figure 3:
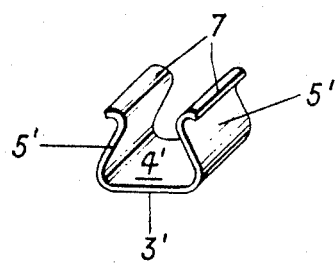
Figure 5:
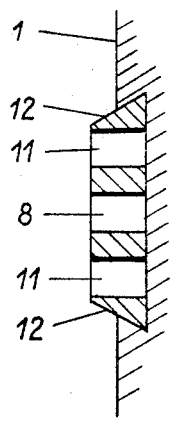
Figure 4:
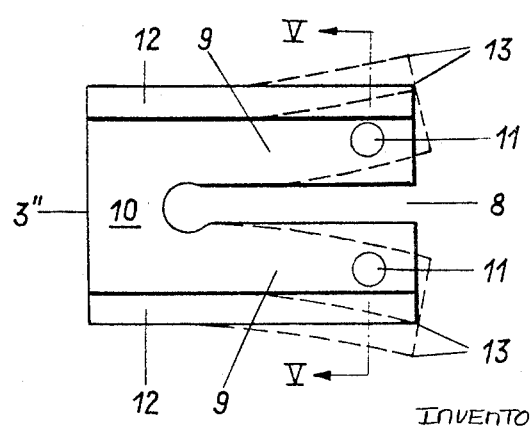

These and further objects, features and advantages of the present invention will become more obvious from the following description when taken in connection with the accompanying drawing which shows, for purposes of illustration only, several embodiments in accordance with the present invention, and wherein:

FIGURE 1 is a partial cross sectional view through a gas turbine rotor within the area of the aperture for the balancing weights, FIGURE 2 is a perspective view of one embodiment of of a balancing weight in accordance with the present invention, FIGURE 3 is a perspective view of a modified embodiment of a balancing weight in accordance with the present invention, FIGURE 4 is a top plan view of still a further modified embodiment of a balancing weight in accordance with the present invention, and FIGURE 5 is a cross sectional view through the balancing weight of FIGURE 4 in the installed condition thereof, taken along line V—V of FIGURE 4, FIGURE 6 is an end view of the gas turbine rotor showing a ring shaped aperture including an insert opening for the reception of balancing weights.

Referring now to the drawing wherein like reference numerals are used throughout the various views to designate like parts, and more particularly to FIGURE 1, a ring-shaped aperture or recess 2 having, for example, a dovetail-shaped cross section for the accommodation of balancing weights 3, 3' and 3", is arranged within the rotating body 1, for instance, of a gas turbine rotor, at the end face thereof. The balancing weights 3, 3' and 3" which are shaped corresponding to the cross section of the aperture 2, are thereby assembled and emplaced into the aperture or recess 2 through an insert opening or enlargement 2' of the aperture or groove 2 as shown in FIGURE 6 and are then moved to the respective required place of the rotating body 1 to achieve the compensation in the unbalance.

For that purpose, the balancing weights 3 and 3', as illustrated in FIGURES 2 and 3, are constructed as inherently elastic or springy stampings of sheet metal, for example, of spring steel which, as viewed in cross section, are provided with side walls 5 and 5' extending to one another at an inclination under a predetermined angle (corresponding to the cross section of the aperture 2) and connected by a cross web 4 and 4', respectively. Bores are provided in FIGURE 2 at the two ends of the lateral walls 5 for the insertion of a conventional clamping or tensioning device, for example, of a Seeger-tensioning plier in order to be able to compress thereby the elastic balancing weight 3 and thus enable displacement thereof within the aperture 2.

In FIGURE 3, angularly bent ends 7 are provided in lieu of the bores 6 for the application of the conventional clamping or tensioning device which also enable the compressing of the balancing weights during assembly and installation thereof.

FIGURES 4 and 5 illustrate a further embodiment of the present invention whereby the balancing weight 3″ is made from solid stock material by machining operations. The balancing weight 3″ consists of two longitudinal webs 9 separated by the longitudinal slot—terminating in a rounded off aperture—and of a cross web 10 connecting the longitudinal webs 9 whereby bores 11 are provided within the outer region of the longitudinal webs 9 for the application of a conventional tensioning or clamping device. The longitudinal webs 9 include abutment surfaces 12 extending with respect to each other at a certain angle and corresponding to the cross section of the aperture 2. For purposes of machining the abutment surface 12, the balancing weight 3″ is compressed by a conventional tensioning or clamping device, which engages into the bores 11, by an amount corresponding to the width of the longitudinal gap 8 up to mutual abutment of the longitudinal webs 9, and is thereupon machined in such a manner that in the installed condition of the balancing weight 3″ the abutment surfaces 12 extend parallel to one another (see full lines in FIG. 4). If one removes the tensioning or clamping device, then the longitudinal webs 9 elastically yield in the outward direction and the balancing weight 3″ assumes the shape illustrated in dash lines in FIGURE 4.

For purposes of installation of the balancing weights 3, 3′ and 3″, the latter are brought into an insert opening 2′ of the apearture or groove 2 as shown in FIGURE 6 and are thereupon compressed by means of a suitable conventional clamping or tensioning device, for example, by means of a Seeger-clamping plier and are then displaced within the aperture 2 to the respective required place. After removal of the tensioning or clamping pliers, the leg portions of the balancing weights spread apart by reason of the pre-stress thereof against the walls of the aperture 2 and thus secure the balancing weights against tangential displacement by frictional engagement.

This effect is additionally enhanced by the sharp edge 13 in the embodiment of FIGURE 4 which slightly presses into the sidewalls of the aperture 2.

While we have shown and described several embodiments in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are encompassed by the scope of the appended claims.

We claim:

1. An arrangement for fastening balancing weights on rotating bodies, especially on rotors of flow machines rotating at high speeds, within annularly shaped apertures of said rotating bodies arranged in the end faces thereof and forming sidewalls, said weights comprising elastic structural portions, said arrangement comprising:
   mutually cooperating means in said weights and in said apertures,
   said cooperating means in a respective one of said weights being constituted by said elastic structural portions including spaced abutment surfaces thereof,
   said cooperating means in respective one of said apertures being constituted by said sidewalls thereof, said one of said apertures corresponding approximately in width to the distance between said spaced abutment surfaces,
   said respective one of said weights by reason of said elastic structural portions springily expanding and forcing said spaced abutment surfaces against said sidewalls of said respective one of said apertures and being tangentially non-displaceably secured therein by the resulting frictional engagement therewith.

2. An arrangement for fastening balancing weights on rotating bodies, especially on rotors or flow machines rotating at high speeds, within annularly shaped apertures of said rotating bodies arranged in the end faces thereof and forming side walls, said weights comprising elastic structural portions, said arrangement comprising:
   mutually cooperating means in said weights and in said apertures,
   said cooperating means in a respective one of said weights being constituted by said elastic structural portions including spaced abutment surfaces thereof,
   said cooperating means in respective one of said apertures being constituted by said sidewalls thereof, said one of said apertures corresponding approximately in width to the distance between said spaced abutment surfaces,
   said respective one of said weights by reason of said elastic structural portions springily expanding and forcing said spaced abutment surfaces against said sidewalls of said respective one of said apertures and being tangentially non-displaceably secured therein by the resulting frictional engagement therewith,
   said elastic structural portions of each of said weights having, as seen in cross section, lateral wall portions extending inclined to one another at a predetermined angle, and a cross web portion connecting said lateral wall portions.

3. An arrangement for fastening balancing weights on rotating bodies, especially on rotors of flow machines rotating at high speeds, within annularly shaped apertures of said rotating bodies arranged in the end faces thereof and forming sidewalls, said weights comprising elastic structural portions, said arrangement comprising:
   mutually cooperating means in said weights and in said apertures,
   said cooperating means in a respective one of said weights being constituted by said elastic structural portions including spaced abutment surfaces thereof,
   said cooperating means in respective one of said apertures being constituted by said sidewalls thereof, said one of said apertures corresponding approximately in width to the distance between said spaced abutment surfaces,
   said respective one of said weights by reason of said elastic structural portions springily expanding and forcing said spaced abutment surfaces against said sidewalls of said respective one of said apertures and being tangentially non-displaceably secured therein by the resulting frictional engagement therewith,
   said elastic structural portions of each of said weights having, as seen in cross section, lateral wall portions extending inclined to one another at a predetermined angle, and a cross web portion connecting said lateral wall portions,
   said ends of the lateral wall portions being provided with bores for the insertion of an installation tool.

4. An arrangement for fastening balancing weights on rotating bodies, especially on rotors of flow machines rotating at high speeds, within annularly shaped apertures of said rotating bodies arranged in the end faces thereof and forming sidewalls, said weights comprising elastic structural portions, said arrangement comprising:
   mutually cooperating means in said weights and in said apertures,
   said cooperating means in a respective one of said weights being constituted by said elastic structural portions including spaced abutment surfaces thereof,
   said cooperating means in respective one of said apertures being constituted by said sidewalls thereof, said one of said apertures corresponding approximately in width to the distance between said spaced abutment surfaces, said respective one of said weights by reason of said elastic structural portions springily expanding and forcing said spaced abutment surfaces against said sidewalls of said respective one of said apertures and being tangentially non-displaceably secured therein by resulting frictional engagement therewith, said elastic structural portions of each of said weights having, as seen in cross section, lateral wall portions extending inclined to one another at a predetermined angle, and a cross web portion connecting said lateral wall portions, said two ends of the lateral wall portions being provided with angularly bent portions for the application of an installation tool.

5. An arrangement for fastening balancing weights on rotating bodies, especially on rotors of flow machines rotating at high speeds, within annularly shaped apertures of said rotating bodies arranged in the end faces thereof and forming sidewalls, said weights comprising elastic structural portions, said arrangement comprising:

mutually cooperating means in said weights and in said apertures, said cooperating means in a respective one of said weights being constituted by said elastic structural portions including spaced abutment surfaces thereof, said cooperating means in respective one of said apertures being constituted by said sidewalls thereof, said one of said apertures corresponding approximately in width to the distance between said spaced abutment surfaces, said respective one of said weights by reason of said elastic structural portions springily expanding and forcing said spaced abutment surfaces against said sidewalls of said respective one of said apertures and being tangentially non-displaceably secured therein by the resulting frictional engagement therewith, each of said weights being made of solid stock material and being provided with a cut-in longitudinal slot forming two longitudinal web portions comprised in said elastic structural portions, a cross web portion connecting said longitudinal web portions, and bores provided within the end region of the longitudinal web portions.

6. An arrangement for fastening balancing weights on rotating bodies, especially on rotors of flow machines rotating at high speeds, within annularly shaped apertures of said rotating bodies arranged in the end faces thereof and forming sidewalls, said weights comprising elastic structural portions, said arrangement comprising:

mutually cooperating means in said weights and in said apertures, said cooperating means in a respective one of said weights being constituted by said elastic structural portions including spaced abutment surfaces thereof, said cooperating means in respective one of said apertures being constituted by said sidewalls thereof, said one of said apertures corresponding approximately in width to the distance between said spaced abutment surfaces, said respective one of said weights by reason of said elastic structural portions springily expanding and forcing said spaced abutment surfaces against said sidewalls of said respective one of said apertures and being tangentially non-displaceably secured therein by the resulting frictional engagement therewith, each of said weights being made of solid stock material and being provided with a cut-in longitudinal slot forming two longitudinal web portions comprised in said elastic structural portions, a cross web portion connecting said longitudinal web portions, and bores provided within the end region of the longitudinal web portions, said abutment surfaces being disposed on said longitudinal web portions and extending with respect to each other at a predetermined angle.

References Cited by the Examiner

UNITED STATES PATENTS

| | | | |
|---|---|---|---|
| 1,620,871 | 3/1927 | Carrey | 74—573 |
| 2,197,312 | 4/1940 | Nelson | 74—568 |
| 2,958,165 | 11/1960 | Hormann | 51—169 |

MILTON KAUFMAN, *Primary Examiner.*

BROUGHTON G. DURHAM, *Examiner.*

W. S. RATLIFF, *Assistant Examiner.*